United States Patent Office 3,026,152
Patented Mar. 20, 1962

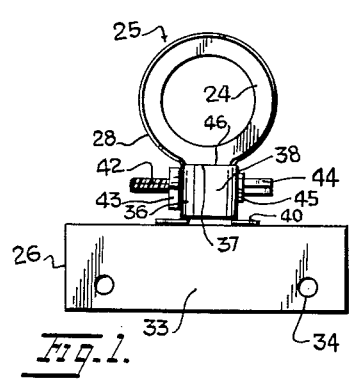
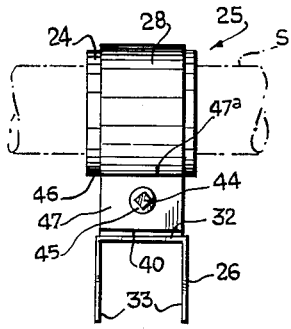
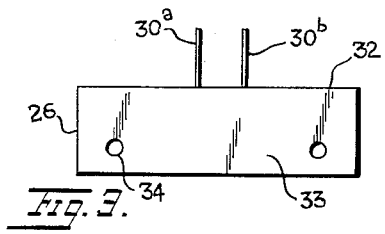
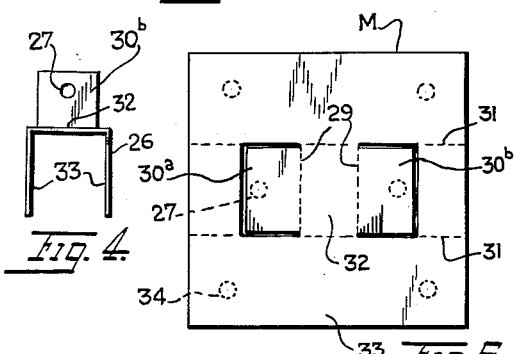
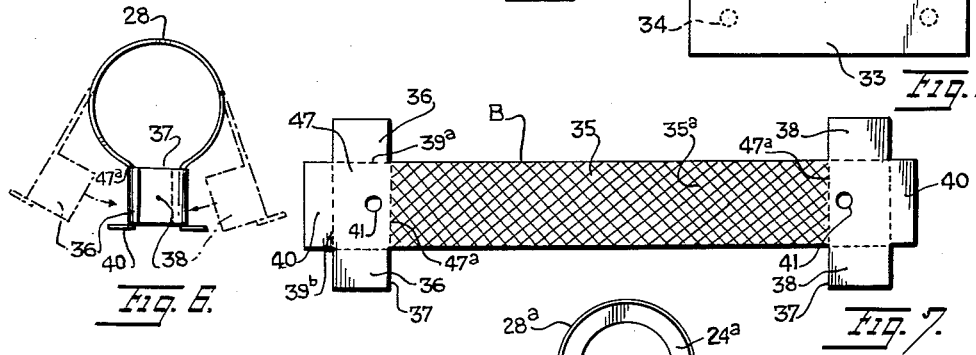
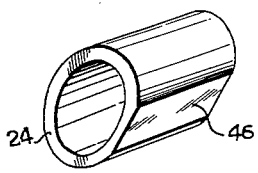
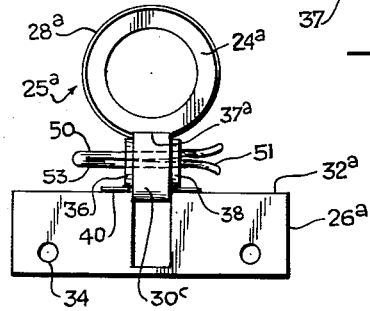
INVENTOR.
LEO LUCA LIGGIO

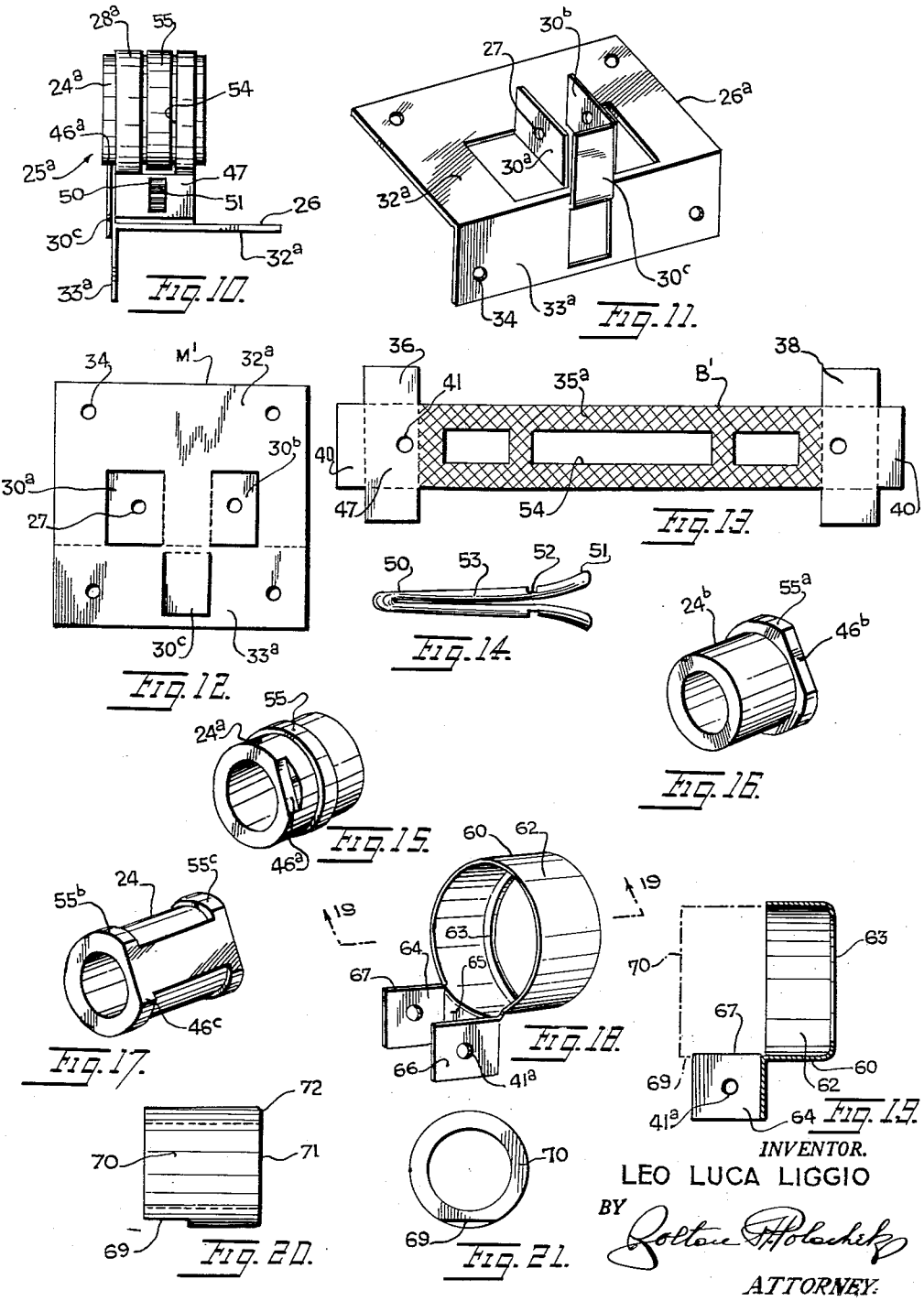

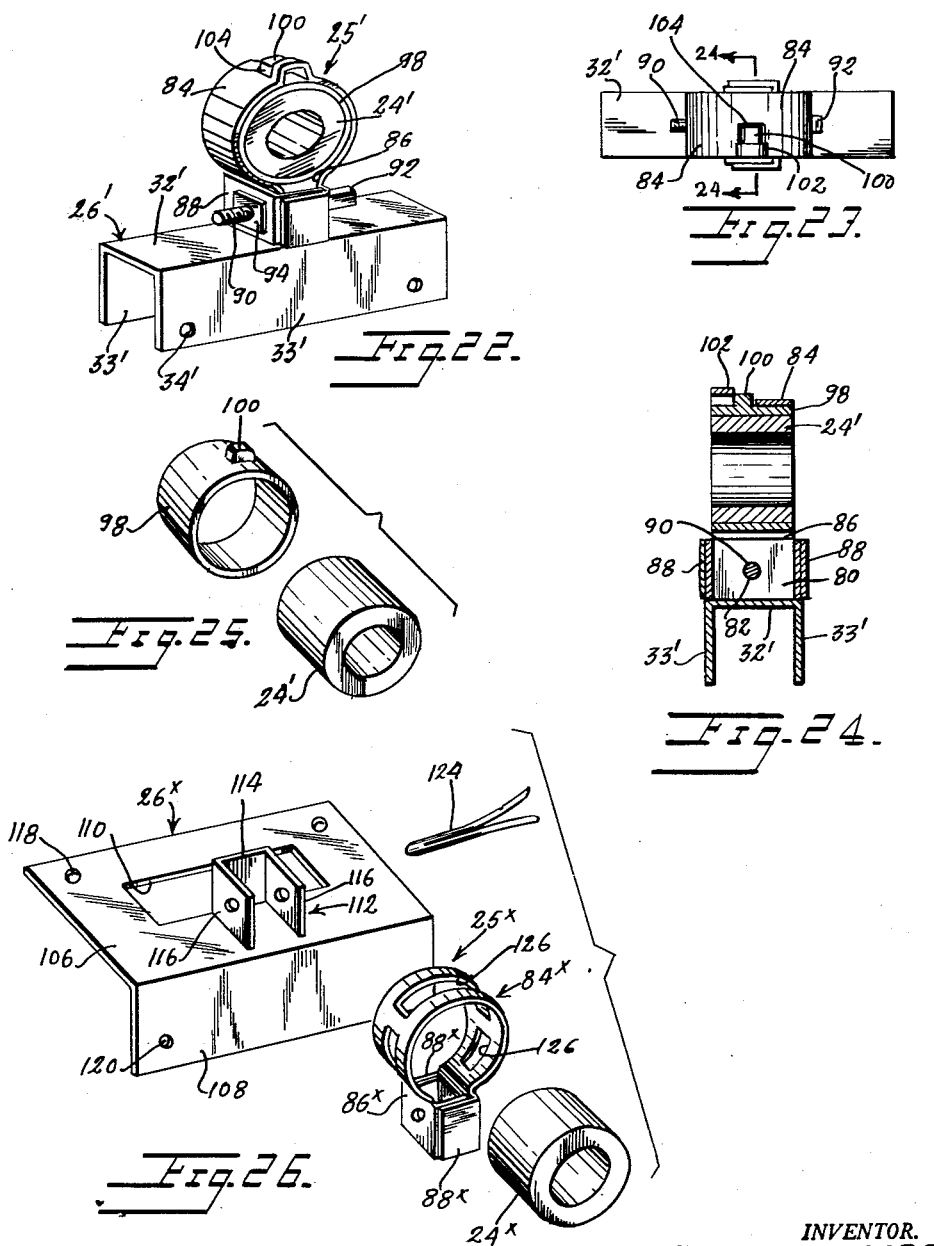

3,026,152
INTERCHANGEABLE BEARINGS
Leo Luca Liggio, 83 Cox Ave., Yonkers, N.Y.
Filed Nov. 14, 1960, Ser. No. 69,205
9 Claims. (Cl. 308—15)

This invention concerns a novel bearing assembly especially adapted for supporting a rotatable shaft.

According to the invention there is provided a self-lubricated cylindrical bushing made of graphite, nylon, oil impregnated bronze, or the like. The bushing is enclosed and supported in a ring of sheet metal secured to a bent sheet metal bracket or hanger.

It is one object of the invention to provide a novel support for a bearing bushing.

It is a further object to provide a novel sheet metal hanger or bracket for a shaft bearing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of one bearing assembly embodying the invention.

FIG. 2 is a side elevational view of the bearing assembly showing a supported pipe in dot-dash lines.

FIG. 3 is a front view of a bracket employed in the assembly of FIGS. 1 and 2.

FIG. 4 is an end elevational view of the bracket of FIG. 3.

FIG. 5 is a plan view of a metal blank from which the bracket of FIGS. 3 and 4 is formed.

FIG. 6 is an end elevational view of a bushing support ring employed in the bearing assembly.

FIG. 7 is a plan view of a blank from which the ring of FIG. 6 is formed.

FIG. 8 is a perspective view of a bushing employed in the bearing assembly.

FIG. 9 is a front elevational view of another bearing assembly embodying the invention.

FIG. 10 is a side elevational view of the bearing assembly of FIG. 9.

FIG. 11 is a perspective view of the bracket employed in the assembly of FIGS. 9 and 10.

FIG. 12 is a plan view of a metal blank from which the bracket of FIG. 11 is formed.

FIG. 13 is a plan view of a blank from which the bushing support ring of the assembly of FIGS. 9 and 10 is formed.

FIG. 14 is a side view of a pin employed to secure the ring to the bracket in the bearing assembly of FIGS. 9 and 10.

FIG. 15 is a perspective view of a bushing employed in the bearing assembly of FIGS. 9 and 10.

FIGS. 16 and 17 are perspective views of other bushings which may be employed in the bearing assemblies of FIGS. 1 and 9.

FIG. 18 is a perspective view of another bearing ring.

FIG. 19 is a sectional view taken on line 19—19 of FIG. 18.

FIG. 20 is a side elevational view of a bushing which may be employed in the bearing ring of FIGS. 18 and 19.

FIG. 21 is an end elevational view of the bushing of FIG. 20.

FIG. 22 is a front perspective view of a bearing assembly embodying still another modified form of the invention.

FIG. 23 is a top plan view thereof.

FIG. 24 is a sectional view taken on the line 24—24 of FIG. 23.

FIG. 25 is a spread perspective view of the bushing and sleeve used in the assembly of FIG. 22.

FIG. 26 is a spread perspective view of a bearing assembly embodying yet another modified form of the invention.

Referring to FIGS. 1–8, there is shown a bearing assembly 25 including a bracket 26 to which is secured a ring 28. In the ring is mounted a cylindrical bushing 24. The bracket 26, as best shown in FIGS. 1–5, is formed from a rectangular metal blank M. Two rectangular tabs 30$^a$, 30$^b$ are punched out and bent on lines 29 to stand upwardly from the top plane 32 of the bracket. The outer edges of the blank are bent downwardly along lines 31 to form parallel walls 33. Holes 34 are punched in the walls for receiving screws to mount the bracket on a suitable support.

Ring 28 is formed from a flat blank B shown in FIG. 7. This blank has an elongated central rectangular section 35 knurled or roughened at 35$^a$ on one side and formed with outwardly extending rectangular flaps 36, 38 near opposite ends. These flaps are bent along lines 39$^a$. When the section 35 is bent to cylindrical form as shown in FIGS. 1, 2 and 6, flaps 36 are juxtaposed to and nest within flaps 38. The outer ends of the blank are bent along lines 39$^b$ to form flanges 40. These flanges are placed in abutment with and rest on the top 32 of the bracket. Holes 41 are formed near the ends of the central section in rectangular portions 47 bent at 47$^a$. These holes align with holes 27 formed in tabs 30$^a$, 30$^b$ and receive a bolt 42. A nut 43 is threaded on the end of the bolt. This nut may have a rectangular head 44 adapted to be engaged by a suitable socket wrench for tightening. A flange 45 may be integrally formed with the head and shank of the bolt.

The bushing 24 is cylindrical and has a flat land 46 formed on its outer side. This land rests on the upper edges 37 of flaps 36, 38 so that the bushing is non-rotatable in the ring. A shaft S may be inserted axially through the bushing 24 as indicated by dotted lines in FIG. 2. The bushing is preferably a self-lubricated type, being made of graphite, nylon, or the like.

In FIGS. 9–15 is illustrated another bearing assembly 25$^a$ and components thereof. This bearing assembly includes a bracket 26$^a$ formed from a rectangular blank M', shown in FIG. 12. Holes 34 and tabs 30$^a$ and 30$^b$ are provided as for bracket 26. Only one side wall 33$^a$ is formed from the blank. The top plane 32$^a$ of the bracket is flat and rectangular. Another rectangular tab 30$^c$ is punched out of wall 33a. This tab extends perpendicular to tabs 30$^a$ and 30$^b$ as shown in FIG. 11. The top edge 37$^a$ of tab 30c abuts the flat land 46$^a$ formed on the bushing 24$^a$; see FIG. 15. A bent spring pin 50 (see FIG. 14) with notches 52 in arms 53 is provided in place of bolt 42. This pin extends through holes 27 in tabs 30$^a$ and 30$^b$ and the notches engage in the edges of holes 41 formed in the ring. The free ends of the pin are spaced apart, as shown at 51.

The ring 28$^a$ is formed from a blank B' shown in FIG. 13. It is similar to blank B with roughened or knurled portions 35$^a$ in the central section. A rectangular opening 54 is formed in the central portion of the blank to receive a central peripheral ridge 55 formed on the bushing. The ridge in engagement with the edges of opening 54 prevents axial movement of the bushing while the land 46a in engagement with the top edge of tab 30c prevents rotation of the bushing in the ring. Tabs 36 and 38, end flanges 40 and inner portions 47 are formed in the same manner from blank B' as in blank B.

In FIGS. 16 and 17 are shown bushings $24^b$ and $24^c$ which are alternative forms useful in place of bushings 24 and $24^a$. Lands $46^b$ and $46^c$ prevent rotation of the bushings in the rings. Peripheral ridges $55^a$, $55^b$ and $55^c$ prevent axial movement of the bushings in the rings.

In FIGS. 18 and 19 is shown another ring 60 having a cylindrical body 62 with an inturned edge 63 to prevent axial movement of a bushing therein. Tabs 64, 66 serve the same function as tabs 36, 38. They are provided with holes $41^a$ for receiving a bolt or securing pin. These tabs are integral with a rectangular web or wall 65 bent outwardly from the inner edge 67 of the ring. The top edges 67 of the tabs 64, 66 will engage a land 69 formed on bushing 70 shown in FIGS. 20 and 21.

Bushing 70 is cylindrical in form. A portion of its periphery is flattened to define the land 69. The outer end 71 of the bushing is filleted at 72 to engage in the edge 63 of the ring 60. The ring 60 and bushing 70 may be employed in place of ring 28 and bushing 24 on bracket 26.

A particular feature of the invention is the formation of the several brackets and rings from sheet metal pressed and punched to required form. This effects an economy in manufacture, since prior mountings for cylindrical bushings have heretofore been formed of castings which require complex machinery and are expensive to manufacture.

In the present invention the several bushings, brackets, and rings are interchangeable for others depending on the particular requirements of the bearing load, sizes of the shafts to be supported, etc.

Referring now to the modified form of bearing assembly shown in FIGS. 22 to 25, inclusive, in this form the supporting bracket 26' has a channel-shaped body with a top wall 32' and downwardly extending side walls 33'. Midway its ends, the top wall is formed with a pair of outstruck upstanding ears 80 having central aligned holes 82. A split ring-shaped bearing 84 of sheet metal has downwardly extending ears 86, the ears being formed with overlapping extensions 88. The ears 86 are formed with opposed openings aligned with the holes 82 in the ears 86. The ears 86 are disposed over the upstanding ears 80 of the bracket 26' with the openings in line with the holes 82 in the ears 80. A screw 90 having an elongated head 92 square in cross section extends through the aligned perforations and openings in the ears, the threaded end of the screw extending outwardly of the ears 86 and secured in position by a nut 94. A bushing assembly, as best shown in FIG. 25, is forcibly fitted into the ring-shaped bearing 84. The bushing assembly comprises a bushing member 24' and a skin covering therefor in the form of an expansible sleeve 98 which clings to the bushing to prevent relative movement therebetween. The bushing and sleeve may be fixed to each other by heating the sleeve to expand the same and while it is on the bushing permitting it to cool and contract into biting relation with the bushing.

The sleeve is formed with an upstanding stud 100 radially extending from the outer surface thereof intermediate its ends. The bearing assembly is slid into the split ring 84 with the stud 100 passing under and through a perforated ear 102 formed on the perimeter of the split ring at one end thereof and into a slot 104 formed in the split ring and intersecting the openings in the perforated ear 102 whereby the stud interlocks with the edge walls of the slot 104 to prevent relative rotational movement between the bushing assembly and the split ring. The bore in the bushing 24' is adapted to support a shaft such as the shaft S shown in FIG. 2. Holes 34' are formed in the side walls 33' adjacent the ends thereof for receiving screws to mount the bracket on a suitable support.

Another modified form of bearing assembly $25^x$ is shown in FIG. 26. In this form, the bracket $26^x$ takes the form of a rectangular plate 106 with a downwardly extending flange 108 along one long edge thereof. The body of the plate is outstruck along its central portion forming a central cutout portion 110 and forming an outstruck U-shaped auxiliary bracket 112 with a bight portion 114 and perforated leg portions 116. The body of the plate is formed with corner holes 118 and the flange with corner openings 120 for securing the bracket to a support.

A broad split ring bearing member $84^x$ has downwardly extending perforated ears $86^x$, the ears being formed with overlapping extensions $88^x$. The perforated ears $86^x$ and overlapping extensions $88^x$ are fitted in between the perforated leg portions 116 of the auxiliary bracket 112 and a cotter pin 124 is passed through the aligned perforations in the ears and holes, in order to secure the split ring bearing to the bracket. The bearing member $84^x$ is formed with a series of slots 126 around the body thereof thereby making the body of the bearing member springy in order to cling to a bushing member $24^x$ inserted therethrough, the inherent springiness of the material of the bushing member causing the edge walls of the slots to bite into the surface of the bushing member $24^x$ and prevent relative rotary movement therebetween. The bushing member $24^x$ is adapted to support a shaft.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A bearing assembly, comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, said bracket having another tab extending from said top wall in a plane perpendicular to the first-named tabs, said other tab having a flat edge for supporting said bushing.

2. A bearing assembly, comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, said bracket having another tab extending from said top wall in a plane perpendicular to the first-named tabs, said other tab having a flat edge for supporting said bushing, said bushing having a flat land on its outer side abutting said flat edge.

3. A bearing assembly, comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, said ring member being formed with an opening extending circumferentially between opposite axial edges of the ring member, said bushing being formed with a peripheral ridge engaged in said opening to prevent axial movement of the bushing in the ring member.

4. A bearing assembly comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, said ring member being formed with an opening extending circumferentially between opposite axial edges of the ring member, said bushing being formed with a peripheral ridge engaged in said opening to prevent axial movement of the bushing in the ring member, there being flanges formed at outer edges of said bent portions forming abutments on said flat top wall of the bracket.

5. A bearing assembly, comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, there being flanges formed at outer edges of said bent portions forming abutments on said flat top wall of the bracket.

6. In a bearing assembly for a shaft, a cylindrical bushing, and a ring supporting said bushing, said ring being a cylindrical member formed from sheet metal, said ring having a wall extending outwardly therefrom at one edge, and apertured flaps bent forwardly from said wall for securing the ring to a support, said bushing having a flat external land, said flaps having straight edges abutting said land to prevent rotation of the bushing in the ring, said ring having a radially inwardly turned edge preventing axial movement of the bushing in the ring.

7. A bearing assembly, comprising a self-lubricated cylindrical bushing, a sheet metal ring member wound around said bushing, said ring member being formed with bent portions having overlapping flaps, and a sheet metal bracket having a flat top wall and upstanding parallel tabs, said bent portions and tabs having aligned holes, said tabs being interfitted with said bent portions, and a fastening member inserted through the aligned holes securing the ring to the bracket, said ring member being formed with an opening extending circumferentially between opposite axial edges of the ring member, said bushing being formed with a peripheral ridge engaged in said opening to prevent axial movement of the bushing in the ring member, said fastening member being a bent spring pin having arms formed with notches adapted to engage in the holes in said tabs and bent portions, outer free ends of said pin being spaced apart beyond one of said bent portions of the ring member.

8. A bearing assembly, comprising a self-lubricated cylindrical bushing, a sheet metal split ring member wound around said bushing, said ring member having depending ears with overlapping extensions, and a sheet metal bracket having a flat top wall and upstanding parallel ears, said ring member ears and bracket ears having aligned perforations, said bracket ears being interfitted into the ring ears, and a screw extending through the aligned perforations to secure the ring to the bracket, a perforated ear on the peripheral edge of the ring at one end thereof, said ear projecting outwardly of the body of the ring, said ring having a slot intersecting the perforation in the ear, and a lug on the bushing extending radially of its outer surface intermediate its ends and disposed in the slot behind the perforated ear in the ring and interlocking with the edge walls of the slot to prevent relative rotary movement of the ring and bushing.

9. A bearing assembly, comprising a self-lubricated cylindrical bushing, a sheet metal ring member wound around said bushing, said ring member being formed with depending perforated ears with overlapping extensions, and a sheet metal bracket having a rectangular plate-like body with a flange depending from one long edge thereof, said body and flange having openings for receiving fastening elements for securement to a support, said plate-like body having outstruck parallel spaced ears with openings therein, the perforated ears on the ring being interfitted between the perforated ears on the plate-like body, and a cotter pin extending through the perforations in the interfitting ears securing the ring to the bracket, said ring having a series of slots centrally thereof, whereby said ring member has springy characteristics, the edge walls of the slots adapted to engage the surface of the bushing to prevent relative rotary movement between the ring member and bushing.

References Cited in the file of this patent

UNITED STATES PATENTS

| | | |
|---|---|---|
| 667,644 | Appleby | Feb. 5, 1901 |
| 2,819,932 | Walker | Jan. 14, 1958 |
| 2,843,432 | Kindig | July 15, 1958 |

FOREIGN PATENTS

| | | |
|---|---|---|
| 469,683 | Great Britain | Aug. 2, 1938 |